US011226817B2

(12) United States Patent
Karve et al.

(10) Patent No.: US 11,226,817 B2
(45) Date of Patent: Jan. 18, 2022

(54) PREFETCHING WORKLOADS WITH DEPENDENT POINTERS

(71) Applicant: International Business Machines Corporation, Armonk, NY (US)

(72) Inventors: Mohit Karve, Austin, TX (US); Donald R. Stence, Pflugerville, TX (US); John B. Griswell, Jr., Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/508,671

(22) Filed: Jul. 11, 2019

(65) Prior Publication Data

US 2021/0011721 A1    Jan. 14, 2021

(51) Int. Cl.
*G06F 9/30* (2018.01)
*G06F 9/38* (2018.01)
*G06F 12/1018* (2016.01)
*G06F 12/0862* (2016.01)

(52) U.S. Cl.
CPC ........ *G06F 9/30043* (2013.01); *G06F 9/3838* (2013.01); *G06F 12/0862* (2013.01); *G06F 12/1018* (2013.01); *G06F 2212/602* (2013.01); *G06F 2212/657* (2013.01)

(58) Field of Classification Search
CPC .................................................. G06F 9/30043
See application file for complete search history.

(56) References Cited

U.S. PATENT DOCUMENTS

| 6,438,673 | B1  |   | 8/2002 | Jourdan et al. |              |
|-----------|-----|---|--------|----------------|--------------|
| 7,395,407 | B2  |   | 7/2008 | Shen et al.    |              |
| 8,838,937 | B1  | * | 9/2014 | Katz           | G06F 12/0246 |
|           |     |   |        |                | 711/216      |
| 8,966,155 | B1  | * | 2/2015 | Mulligan       | G06F 12/0875 |
|           |     |   |        |                | 711/103      |

(Continued)

OTHER PUBLICATIONS

Anonymous, "Method for stride-profile guided prefetching for irregular code," ip.com, An IP.com Prior Art Database Technical Disclosure, IP.com No. IPCOM000029128D, IP.com Electronic Publication Date: Jun. 16, 2004, 8 pages.

(Continued)

*Primary Examiner* — John M Lindlof
(74) *Attorney, Agent, or Firm* — Peter I. Edwards

(57) ABSTRACT

A set of dependence relationships in a set of program instructions is detected by a processor. The set of dependence relationships comprises a first load instruction to load a first data object and a second load instruction to load a second data object from a second address that is provided by address data within the first data object. The processor identifies a number of dependence instances in the set of dependence relationships and determines that the number is over a pattern threshold. The processor sends an enhanced load request to a memory controller. The enhanced load request comprises instructions to load the first data object from a first address on a physical page, locate address data in the first data object based on a memory offset, load the second data object from a second address in the address data, and transmit the first and second data objects to the processor.

20 Claims, 6 Drawing Sheets

(56) References Cited

U.S. PATENT DOCUMENTS

| | | |
|---|---|---|
| 9,116,817 B2 | 8/2015 | Meier |
| 10,133,672 B2 | 11/2018 | Aguilera Diez et al. |
| 2003/0105942 A1* | 6/2003 | Damron ............... G06F 9/3842 712/216 |
| 2007/0288726 A1* | 12/2007 | Luick ................. G06F 9/30185 712/225 |
| 2013/0339595 A1* | 12/2013 | Kumar ................. G06F 9/3838 711/105 |
| 2017/0371720 A1* | 12/2017 | Basu .................... G06F 9/4881 |
| 2019/0179766 A1* | 6/2019 | Venkatasubramanian ................... G06F 12/1009 |

OTHER PUBLICATIONS

Black et al., "Load Execution Latency Reduction," ACM, Proceedings of the 12th International Conference on Supercomputing, 1998, 21 pages.

* cited by examiner

PREFETCHING WORKLOADS WITH DEPENDENT POINTERS

BACKGROUND

The present disclosure relates to memory management, and more specifically, to prefetching data.

Data prefetching involves predicting which data will be needed by a processor and preemptively sending the predicted data to the processor before the processor needs the data. By utilizing data prefetching, processes performed by the processor may be made to run more efficiently because the data may be available for the computer component when it is required. This sometimes allows the negative effects of memory latency (i.e., the time associated with requesting data from memory and transmitting that data from memory to the computer component) to be mitigated or eliminated.

Data is typically stored in memory at a memory address. The program instructions followed by a processor may contain information that either states that memory address, or from which that memory address can be derived. This information is typically referred to as a "pointer." Once the memory address of predicted data is determined (e.g., through a pointer), the data may be prefetched.

SUMMARY

Some embodiments of the present disclosure can also be illustrated as a method for sending an enhanced load request for a data object. The method may include detecting, by a processor, a set of dependence relationships in a set of program instructions. The set of program instructions may comprise a first load instruction to load a first data object and a second load instruction to load a second data object from a second address. This second address may be provided by address data within the first data object. The method may further include identifying, by the processor, a number of instances of dependence in the set of dependence relationships and determining, by the processor, that the number of instances is over a pattern threshold. The method may further include sending, by the processor and based on the determining, an enhanced load request to the memory controller. The enhanced load request may comprise instructions to load the first data object from a first address on a physical page and locate, in the first data object and based on a first memory offset, address data for the second data object. The enhanced load request may also comprise instructions to obtain, from the address data, the second address and to load the second data object from that second address. The enhanced load request may also comprise instructions to transmit the first data object and the second data object to the processor.

Some embodiments of the present disclosure can also be illustrated as a system or computer program product that performs the above-discussed method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
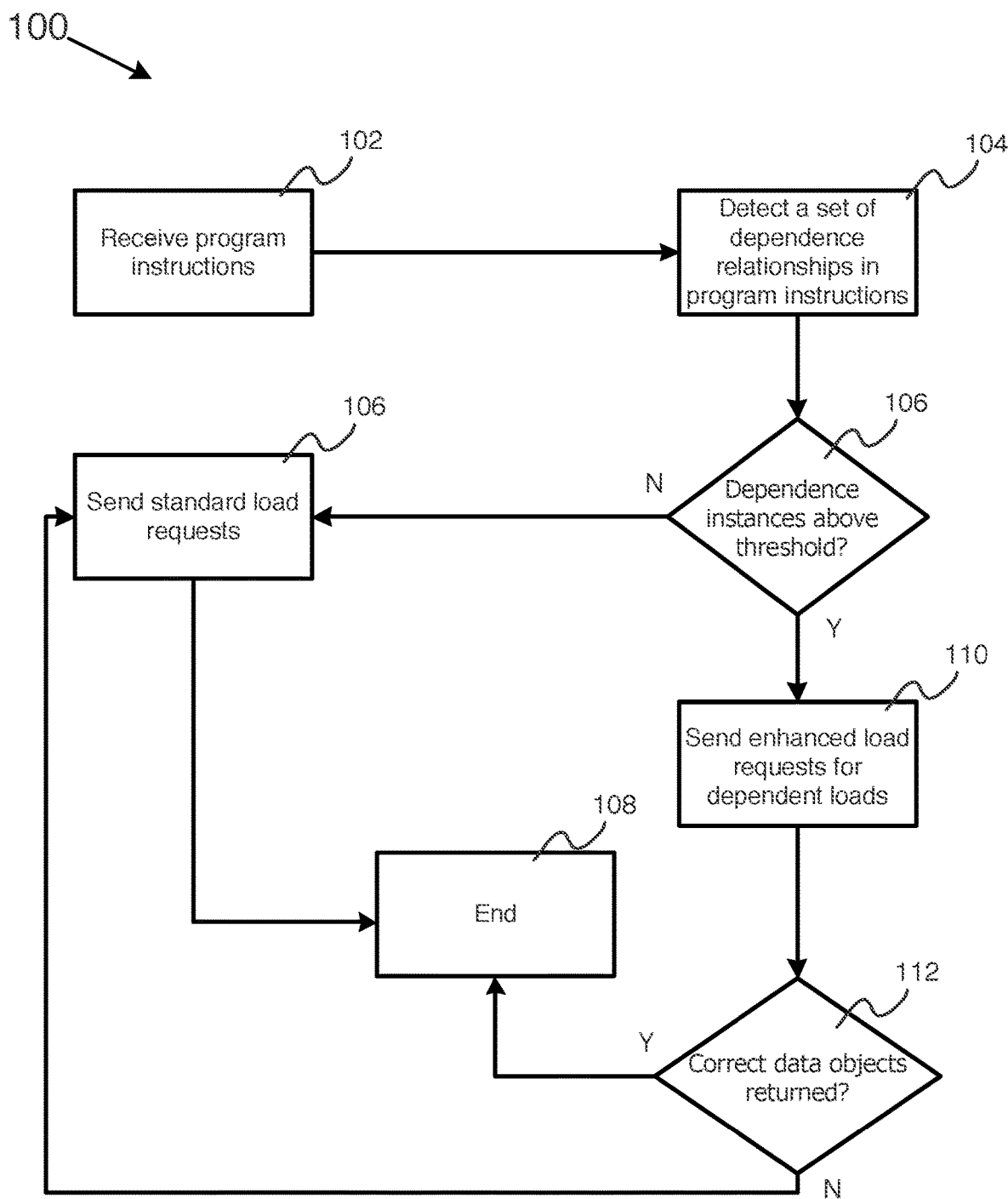
FIG. 1 depicts a method 100 of sending an enhanced load request in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory management, more particular aspects relate to prefetching data. While the present disclosure is not necessarily limited to such applications, various aspects of the disclosure may be appreciated through a discussion of various examples using this context.

Data prefetching typically involves predicting the data that a processor will need at a particular point (e.g., a step of an execution) before the processor has reached that particular point. For example, a processor may be performing a two-step process. The processor may require a first set of data to initiate and perform the first step and a second set of data to initiate and perform the second step. In this example, a memory controller may predict and prefetch the second set of data (for the second step of the process) while the processor is still processing the first set of data during the first step. In other words, the memory controller may send the second set of data to the processor before the processor requires the second set of data. In some instances, this may save time and resources because the second set of data becomes available to the processor at the point at which the processor would normally request the data be fetched. Therefore, the memory latency (the amount of time required for a memory controller to return a requested data load) may be reduced or eliminated in instances in which prefetching is successful.

For predicted data to be prefetched, however, the location of that data in memory (referred to herein as the "memory address") must first be determined. Typically, a pointer is used to identify the memory address of data. In some instances, a pointer may take the form of a statement (for example, in a set of program instructions or in a previously fetched data object) that specifies the precise location of data in memory. In some instances, prefetching data may be relatively straight-forward, because the memory address of the data is explicitly given in the set of program instructions. In other instances, however, a pointer (and thus the memory address) may not be explicitly listed in a set of program instructions, but may be predicted based on the program instructions, previous pointers, or both. Thus, some instances of data prefetching may involve predicting the memory address before the processor is able to conclusively determine the memory address.

Data instructions and processes of different types may store data in memory in various patterns, and thus it is sometimes easier to predict memory addresses in some storage patterns than in others. The storage patterns of some processes are very regular, making the memory locations of data required by those processes relatively simple to predict. For example, some processes require data that is stored at periodic, sequential locations in memory. Once the regular periodic sequence of the data for these processes is identified, a processor or memory controller may predict the memory address for each subsequent data object by calculating the next value in the periodic sequence. Once the memory location is predicted, the memory controller may prefetch the data at that memory location and send it to the processor. Therefore, prefetching data for some processes may be relatively simple even if the program instructions for those processes do not explicitly list the memory addresses of all needed data objects.

However, some processes use memory storage patterns that make determination of memory addresses more difficult. For example, some processes require data that is stored at random locations in memory and do not include explicit pointers in program instructions. In some such processes, the memory address of any particular data object may be ascertainable only by analyzing prior data that has already been fetched for the processor. The storage patterns in these processes are sometimes referred to herein as "dependence patterns" (also referred to herein as "pointer dependence patterns") because obtaining the memory address of a particular data item is dependent on the actual data in the previously loaded data item, and obtaining the memory address of that previously loaded data item may have been dependent on actual data that was loaded even earlier. In some situations, this can create a chain of dependencies, in which the memory addresses of each data object in a long list of data objects is only ascertainable by analyzing the actual data of a previously loaded data object.

For example, processes that involve pointer-chasing workloads may involve a series of data objects that are stored at random memory locations. The data objects may be given in a list (e.g., a linked list) in a set of program instructions for the process. The set of program instructions may also contain instructions to identify the memory address for a particular list item using data retrieved in the last list item. These instructions may take the form of a memory offset (e.g., a number of bits, bytes or lines) that specify the distance between a reference point in memory (e.g., the beginning of a cache line on which the previous data object is located, the first bit of the previous data object) and a pointer within the previous data object in the list. That pointer may identify the memory address of the next data object in the list. When discussed herein, pointers to subsequent data objects (i.e., that identify the memory address of subsequent data objects) and that are located within previous data objects may be referred to herein as "address data" for the subsequent data object (i.e., the data object to be fetched). For example, a linked list data object may contain a data element that contains the memory address of the next data object. Once that data element is fetched from memory, the processor would then be able to read the memory address in the data element and fetch the next data object.

Thus, identifying the memory address of a data object is sometimes not possible until the processor has processed the previous data load. As discussed previously, it is also at this point that the data for the next data load would ideally be prefetched already, minimizing or eliminating the time that the processor would need to wait between processing the previous data load and the next data load. However, if the processor cannot send the memory address of the next data load to the memory controller until the processor has processed the previous data load, it may be very difficult or impossible for the memory controller to find the next data load in advance, and thus very difficult or impossible for the memory controller to prefetch it. Once the processor has processed the previous data load and determined the next memory address, a standard fetching request (also referred to as a standard "load request") may be sent by the processor to the memory controller. The processor may then be required to pause the overall process until the memory controller is able to return the data in response to the standard load request. Thus, the memory latency of this standard load request can lead to performance loss.

Some embodiments of the present disclosure address the difficulties involved with prefetching data associated with pointer dependence patterns by sending enhanced data-load requests to a memory controller when dependence patterns are detected in program instructions. These enhanced data-load requests may include instructions that enable a memory controller to process a first data object before transmitting the first data object to the processor and identify the memory address of a dependent data object within that first data object based on that processing. The memory controller may then transmit the data first object and prefetch the dependent data object before the processor requires it.

In some embodiments of the present disclosure, a processor may request data objects based on a list in a set of program instructions. The list may provide several data objects that are needed in a particular sequence for running the associated program. The program instructions may also provide, with each listed data object, a memory offset. As discussed previously, this memory offset may be a distance in memory between a reference point and address data that is located in the corresponding listed data object. Once read, this address data may provide the location of a subsequent data object in the list (e.g., the data object that is required immediately following the listed data object). If a processor detects that the memory address of a particular data object is ascertainable by referencing the memory offset of a previously loaded data object to locate address data in that previously loaded data object, the processor may determine that the program instructions exhibit a dependence relationship. In other words, the processor may determine that identifying the memory address of the particular data object is dependent on locating the address data (e.g., a pointer) in the previously loaded data object.

When the processor detects a dependence relationship in the program instructions, the processor may identify the number of instances of dependent relationships in the program instructions. In other words, the processor may identify the number of data-object memory addresses that are dependent upon the address data of a previously loaded data object. The number of instances may then be compared to a pattern threshold, which specifies a threshold number of dependence instances. If the number of instances is above the pattern threshold, the processor may conclude with high confidence that the program instructions exhibit a dependence pattern (e.g., a pointer-chasing pattern) and send an enhanced load request to a memory controller.

In some embodiments of the present disclosure, the enhanced load request may instruct and enable the memory controller to prefetch data for the processor. For example, the enhanced load request may instruct the memory controller to retrieve a first data object from a first memory address. The enhanced load request may also instruct the memory controller to utilize a memory offset to located address data within the first data object. This address data may provide a second memory address. The enhanced load instructions may instruct the memory controller to retrieve a second data object from the second memory address, and transmit both data objects to the processor.

FIG. 1 depicts a method 100 of sending an enhanced load request in accordance with embodiments of the present disclosure. In block 102, a processor receives a set of program instructions. The program instructions may contain a list of data that the processor will require to run the program. As part of block 102, the processor may analyze the program instructions and attempt to identify a dependence relationship in the program instructions.

In block 104, the processor does detect a set of dependence relationships. As used with relation to FIG. 1, a "set" is interpreted as containing at least one member, but not necessarily more than one member. Thus, in block 104, the processor detects a set of dependence relationships with at least one instance of a dependence relationship in the set. When analyzing some program instructions, for example, block 104 may include identifying a single load instruction with a memory address that is dependent upon the actual data of a prior load instruction. However, when analyzing some program instructions, block 104 may include identifying 300 load instructions with memory addresses that are dependent upon the actual data of prior load instructions.

Further, in some embodiments block 104 may involve identifying every instance of dependence in the load instructions (e.g., identifying 300 instances in a set of load instructions that contains 300 instances). However, in other embodiments, block 104 may involve identifying any number of instances of dependence in the load instructions (e.g., identifying one instance in a set of load instructions that contains 300 instances, identifying 50 instances in a set of load instructions that contains 300 instances). In some embodiments, block 104 may include attempting to identify further instances of dependence relationships once a first instance of dependence is identified, and add any further instances to the detected set.

For example, when the processor identifies a first dependent relationship, it may scan the set of program instructions for further instances of dependent relationships. In some embodiments, the processor may scan the entire remaining set of program instructions. However, in other embodiments, the processor may scan only a portion of the remaining set of program instructions (e.g., the subsequent ten instructions, every other instruction in the entire set, or others). This may be beneficial, for example, in use cases with a long set of program instructions that may take a large amount of time to scan.

In block 106, the processor determines whether the number of instances in the detected set of dependence relationships is above a pattern threshold. In some embodiments, being above a pattern threshold may indicate that the program instructions exhibit an amount of dependent memory addresses that is high enough to merit prefetching data using enhanced load requests. For example, concluding that the number of dependence instances being above the pattern threshold may indicate that the program instructions include a pointer-chasing pattern, such as in a linked list. In some embodiments, the pattern threshold may be set to 0 instances, such that a single instance of a dependence relationship would be above the threshold. In other embodiments, a higher threshold may be set.

If the processor determines in block 106 that the number of instances is not above the pattern threshold, the processor sends standard load requests for the loads specified by the program instructions in block 108. In some embodiments, for example, the processor may follow the same procedure in block 108 as the processor would normally follow if no dependence relationships were ever detected (e.g., if block 104 did not occur). In some embodiments, the processor may send standard load requests in block 106 for all loads in the program instructions. In some embodiments, separate iterations of method 100 may be performed for each load request. After the processor has sent standard load requests in block 106, the processor proceeds to block 108, in which method 100 concludes.

If, however, the processor determines in block 106 that the number of instances is above the pattern threshold, the processor sends enhanced load requests for dependent loads in block 110. For example, the processor may have detected a first load with a known memory address and a second load with a memory address that is dependent on the actual data retrieved in the first load. In this example, the processor may send an enhanced load request when requesting the actual data for the first load. This enhanced load request may provide instructions, to a memory controller, for determining the location of the memory address of the second load and prefetching the second load.

In some embodiments, block 110 may be performed for every instance of dependence in the program instructions. In other words, in these embodiments, the processor may send instructions, to the memory controller, for determining the memory address of each load (the "dependent load") that is dependent on a prior load and for prefetching that dependent load. In other embodiments, separate iterations of method 100 may be performed for each load request. In some embodiments, block 110 may also include sending standard load requests for non-dependent loads (e.g., loads instructions for data objects whose memory address is not dependent on the actual data of a prior request). These standard load requests may resemble the standard load requests sent as part of block 106.

After a load request for a dependent load is sent in block 110, the processor proceeds to determine, in block 112, whether the data object that was prefetched by the memory controller as a result of block 110 is the data object that was specified by the program instructions. A dependent data object (i.e., a data object retrieved based on a dependent load instruction) may not be the correct data object, for example, if the data objects for the dependent load and the prior load are located on two different physical pages. In this example, the memory controller may not realize that the two data objects occur on different physical pages because the memory controller does not have the ability to translate between logical page numbers (given in logical addresses) and physical page numbers (given in physical pages). The memory controller may thus may transmit data from an incorrect page to the processor when attempting to prefetch the dependent data object. In some examples, both data objects may be on the same physical page, but a memory controller may make an error when locating the address data of a prior data object with the offset of the dependent load request.

If the processor determines, in block 112, that the prefetched data in block 110 is not the data specified by the program instructions (or if the memory controller was unable to prefetch any data), the processor may proceed to block 106 in which standard load requests are resumed. In some embodiments, the processor may then perform block 106 for all subsequent load requests in the program instructions. In other embodiments, the processor may only perform block 106 for the dependent load request for which an incorrect data object was prefetched (or for which no data object was prefetched). If, on the other hand, the processor determines, in block 112, that the correct data was prefetched, the processor proceeds to block 108, in which method 100 ends.

As discussed, in some embodiments a separate iteration of method 100 may be performed for each load request (or for several groups of load requests) in the program instructions. In these embodiments, method 100 in block 108 may refer to the processor concluding one load request and proceeding to a subsequent load request. However, in some embodiments one iteration of method 100 may process all load instructions in a set of program instructions. In these embodiments, block 108 may be reached when all loads in the program instruction have been addressed (i.e., all data specified in the program instructions have been retrieved).

As noted in relation to block 112, in some use cases a dependent data object and a prior data object may be located on two different physical pages in memory. In these use cases, an enhanced load request, as discussed herein, may not provide sufficient information for a memory controller to reliably prefetch the dependent data object. This may occur in systems in which the memory controller is not capable of translating logical memory addresses (e.g., logical page numbers plus page offsets) to physical memory addresses (e.g., physical page numbers plus page offsets), because memory addresses provided in the address data in data objects typically take the form of logical memory addresses. Therefore, the memory controller, in response to an enhanced load request, may predict the number of the logical page on which a dependent data object is located, but may be incapable of translating that logical page number to a physical page number.

In some situations, the memory controller may be capable of determining that the logical page number of the first data object and the second data object are identical (i.e., that the first data object and the second data object are located on the same logical page). In these situations, the memory controller may conclude that the first data object and the second data object are located on the same physical page, because in typical paging systems a single logical page number translates to a single physical page number, and vice versa. In other words, each logical page number typically has a single corresponding physical page number, and each physical page number typically has a single corresponding logical page number.

However, in some situations, the memory controller may determine that the logical page number of the first data object differs from the logical page number of the second data object, indicating that the second data object is not on the same physical page as the first data object. In these latter situations, the memory controller may not be capable of determining the physical page number on which the dependent data object is located without further information from the processor. However, if a memory controller attempts to prefetch the dependent data object in these situations, the processor may waste time analyzing the dependent data object before determining that it is not the data object specified by the program instructions.

Therefore, it may be beneficial, in some embodiments, for a memory controller to compare the logical page number of a first data object to the logical address of second data object that is dependent upon that first data object. However, typical standard load requests for a data object do not provide memory controllers with the logical address (and thus the logical page number) of that data object. Rather, typical standard load requests for a data object only provide memory controllers with the physical address (and thus the physical page number) of that data object. Therefore, it may be beneficial, in some embodiments, for an enhanced load request to include a logical page number of a first data object and instructions for a memory controller to determine whether a dependent data object is on the same logical page as the first data object before prefetching the dependent data object. An example of such a set of instructions is illustrated in FIG. 2.

Figure 2:
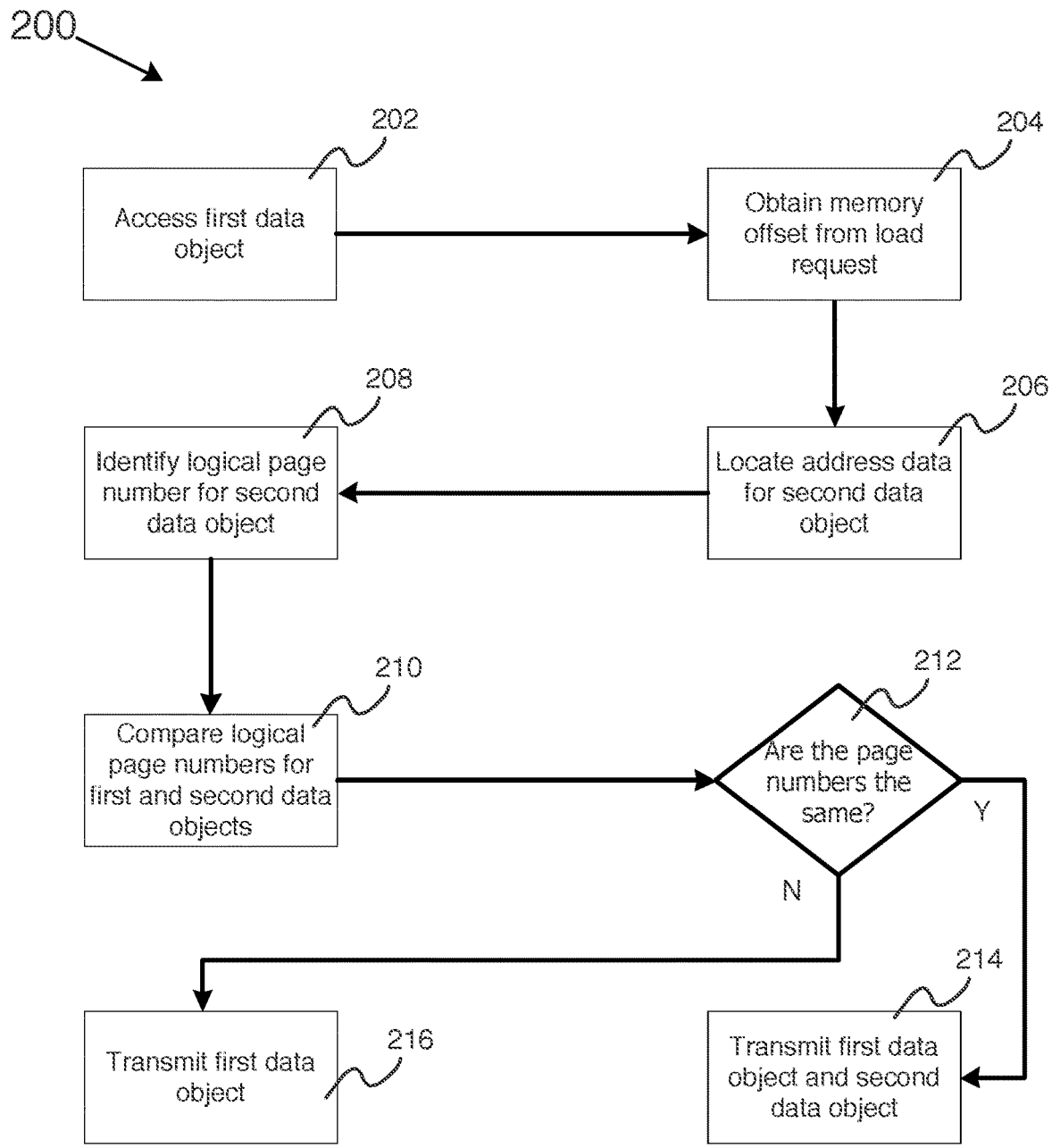
FIG. 2 depicts a method 200 of performing an enhanced load request, in accordance with embodiments of the present disclosure.

FIG. 2 depicts a method 200 of performing an enhanced load request, in accordance with embodiments of the present disclosure. Method 200 may follow a set of instructions provided by the processor, for example, in block 110 of FIG. 1. In block 202, a first data object is accessed from memory by the memory controller. This first data object may be, for example, a data object for which a processor explicitly provided the memory address (for example, if the first data object is part of the first load in a linked list). In this example, the processor may have provided the physical page number of the page on which the first data object is located. In these embodiments, the processor may have also provided the logical page number that corresponds to that physical page number.

The first data object may also be, for example, a data object that is dependent upon another previous data object, and thus the first data object may have been previously prefetched, or may currently be in the process of being prefetched. In this example, the processor may have provided the physical page number of the page of the "another previous data object," along with the corresponding logical page number, and the memory controller may have already concluded that the first data object and the "another previous data object" are located on the same logical page.

In block 204, the memory controller obtains a memory offset from the enhanced load request. As discussed previously, this memory offset may take the form of a distance in memory (e.g., a number of bytes) between the start of a reference point (e.g., the start of the memory cache line on which the first data object is located) and the location of the address data in the first data object. In some embodiments, the memory offset may take the form of a number of bits, bytes, or lines.

In block 206, the memory controller locates address data for the second data object in the first data object using the memory offset obtained in block 204. In some instances, this address data may take the form of a "next" or "previous" pointer. In some embodiments, this address data may take the form of a pointer that gives the logical address of the second data object. In other words, block 206 may provide a memory address (referred to herein as a "dependent memory address") that is dependent upon the actual data in the first data object.

For example, as part of an enhanced load request, a processor may instruct the memory controller to add, in block 206, a specified offset to the memory address that is being requested for a first data object. Adding this offset will result in a new memory address, which may be a subset of the cache line being fetched for the first data object. That new memory address may be the memory address of the first byte of the second data object.

However, as noted previously, that new memory address may be provided in the form of a logical memory address (e.g., a logical page number plus a location on that logical page, such as through a page offset). Thus, the memory controller may not be capable of conclusively determining the physical address of the second data object with the new memory address alone. Thus, the enhanced data load request may, as previously discussed, contain the logical page number of the first data object (or the logical page number of another previous data object that shares a physical page number with the first data object).

Thus, once the address data is located in block 206, the memory controller identifies the logical page number for the second data object in block 208 using the address data. In some embodiments, this logical page number may be part of the logical address (e.g., the first 8 bits of the logical address).

The enhanced load request may also instruct the memory controller to, in block 210, compare the logical page number of the first data object (e.g., the logical page number sent to the memory controller as part of the enhanced load request) with the logical page number resulting identified in block 208.

In block 212, the memory controller determines whether the two logical page numbers are the same. If the memory controller determines that the two logical page numbers are the same, the memory controller may also conclude that the corresponding physical page numbers are the same. In other words, the memory controller may determine that the first data object and second data object share the same physical page number, and are therefore located on the same physical page in memory. Further, because the memory controller already is aware of the physical page number of the page on which the first data object is located, the memory controller can accurately infer the physical page number of the page on which the second data object is located.

Thus, if the memory controller determines that the two logical page numbers are the same, the memory controller accesses the second data object at the memory address resulting from block 206 and transmits, in block 214, the first data object and the second data object to the processor.

However, if the memory controller determines, in block 212, that the two logical page numbers are not the same, the memory controller may be unable to determine the physical page number on which the second data object is located, because the memory controller may be unable to translate from the logical address located in block 206 to the physical address of the second data object. Thus, the memory controller may proceed to transmit, in block 216, only the first data object to the processor. In some embodiments, the transmission in 216 may also include a notification to the processor that the first data object and the second data object are located on different pages. For example, the memory controller could send the first data object and a page-mismatch message. In some embodiments, the page-mismatch message may also include the logical address of the second data object. Such a notification may be beneficial to the processor when preparing future enhanced load requests, because the processor may then translate the logical page number of the second data object into the physical page number of the second data object, which may then be used for future enhanced load requests.

Figure 3:
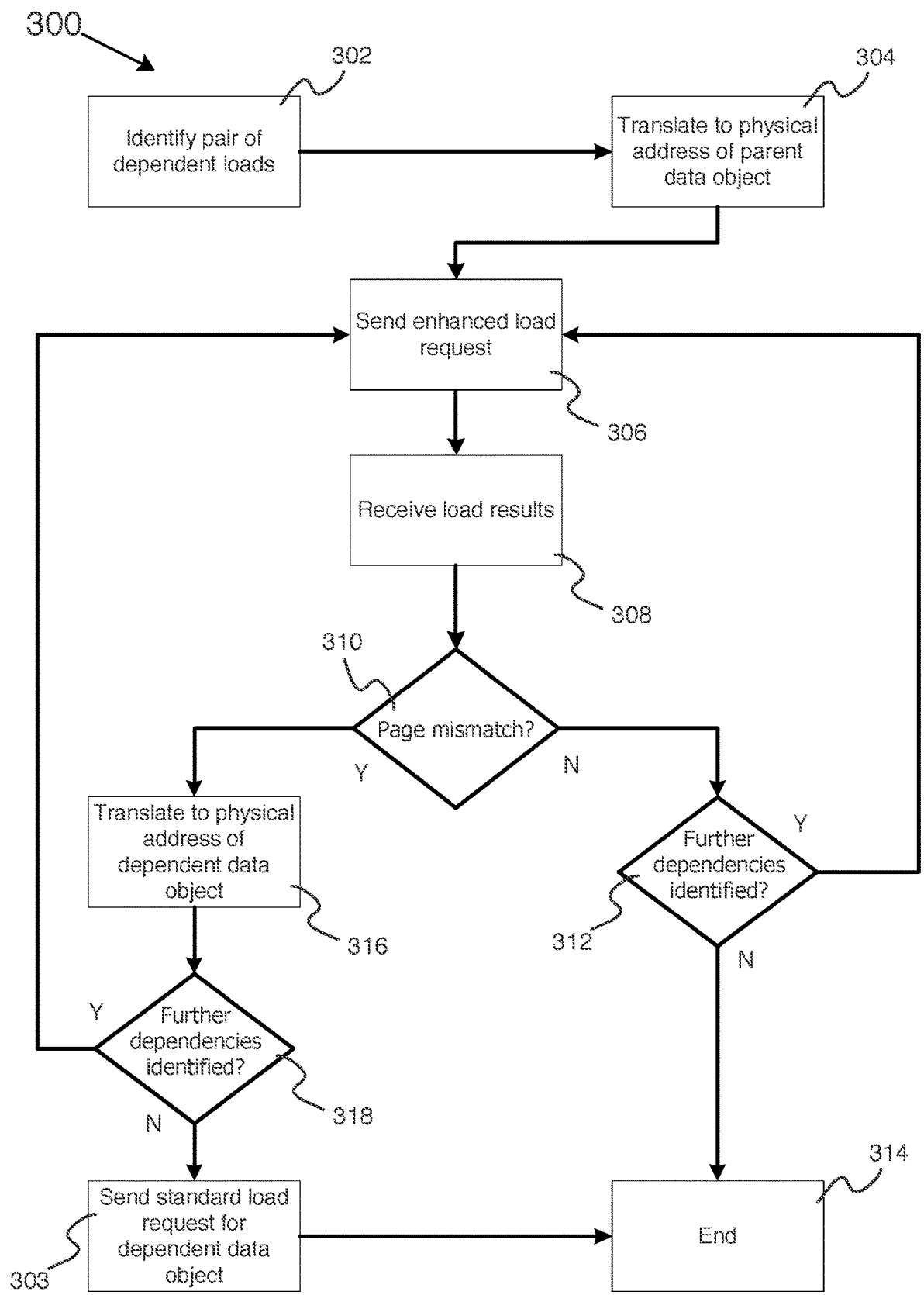
FIG. 3 depicts a method 300 of responding to a page mismatch in a prefetched load, in accordance with embodiments of the present disclosure.

FIG. 3 depicts a method 300 of responding to a page mismatch in a prefetched load, in accordance with embodiments of the present disclosure. Method 300 may be performed by a processor that has previously received a set of program instructions and determined to send an enhanced load request (e.g., by a process similar to that illustrated by blocks 102-106 of method 100).

In block 302, the processor identifies a pair of dependent loads in a received set of program instructions. For example, the processor may identify a first load in a linked list, and a subsequent load whose memory address depends upon data in the first load. With regard to method 300, a load whose memory address depends upon another load is referred to as a "dependent load," and the load on which the dependent load depends is referred to as a "parent load" in relation to that dependent load. Therefore, in some instances a dependent load may depend upon a parent load, but the dependent load may be a parent load with respect to a subsequent dependent load. In other words, in an example instruction set with three loads, the third load may depend on the second load, and the second load may depend on the first load. In this example, the second load may be referred to as a dependent load with respect to the first load, but a parent load with respect to the third load.

Further, with regard to method 300, a data object corresponding to a dependent load may be referred to as a "dependent data object," and a data object corresponding to a parent load may be referred to as a "parent data object." Thus, in block 302, the processor may identify a parent load and a dependent load, wherein the parent load may take the form of an instruction to load a parent data object, and the dependent load may take the form of an instruction to load a dependent data object. As discussed, the memory address of the dependent data object may be dependent upon data that is available in the parent data object.

In block 304, the processor obtains the physical address of the parent data object associated with the parent load by translating the logical address of the parent load to a physical address. The processor may obtain this logical address in several different ways. For example, the processor may obtain the logical address of the parent load from the logical memory address listed in a set of program instructions. The processor may also obtain a logical address from address data of another parent data object on which the parent load itself depends. Finally, in some embodiments, a memory controller may provide the logical address to the processor as part of a previous page-mismatch message.

Once the logical address of the of the parent data object is translated into a physical address, the processor may send, in block 306, the physical address to a memory controller in an enhanced load request that also contains the logical page number that corresponds to that physical address. This enhanced load request may instruct the memory controller to fetch the parent data object at the provided physical address and to prefetch the second data object by a process similar to that provided in method 200.

In some embodiments, the size of this enhanced load instruction may be larger than typical load instructions. In embodiments in which some page mismatches occur, this may create significantly more bus traffic that does not lead to prefetching, and thus does not improve performance. This may occur, for example, when page sizes are relatively small or data objects are relatively large. In these situations, the data objects for required for a process may be spread over multiple different physical pages, which may increase the frequency with which a parent data object and dependent data object occur on different physical pages (i.e., increase the frequency of page mismatches). In these instances, the increased size of the enhanced load instruction may be onerous on the system as compared to the performance benefit of prefetching some dependent data objects. Thus, in some embodiments, it may be beneficial to reduce the size of the enhanced load instruction.

To reduce the size of the enhanced load instruction, block 306 may include hashing the logical page number before it is sent to the memory controller. This may reduce the size of the logical page number. In these embodiments, the memory controller may be required to perform the same hashing algorithm on the logical page number for the dependent data object that the memory controller obtains from address data in the parent data object. The enhanced load instruction may then instruct the memory controller to compare the two hashed logical page numbers, rather than comparing two complete logical page numbers. If the two hashed logical page numbers differ, the memory controller may identify a page mismatch. If the two hashed logical page numbers are identical, however, the memory controller may prefetch the dependent data object.

In block 308, the processor receives, from the memory controller, the results of the enhanced load request. In some instances, the memory controller may return both the parent data object and dependent data object. In other instances, the memory controller may return only the parent data object with a page-mismatch message. In some of those instances, the page-mismatch message may also provide the logical page number (or, in some embodiments, the complete logical address) of the dependent data object, as determined by the memory controller in a process similar to that illustrated by blocks 202 through 208 of method 200.

In block 310, the processor determines whether the memory controller returned a page-mismatch message. If the processor does not detect a page-mismatch message, the processor determines, in block 312, whether any further loads depend upon the dependent load identified in block 302 (i.e., whether the dependent load identified in block 302 is a parent load to any further loads). If the processor does identify a further dependent load in block 312, the processor proceeds to send an enhance load request for that load in block 306. In some embodiments, this may include requesting the memory controller to prefetch the new dependent load.

If, however, the processor does not identify a further dependent load in block 312, the processor concludes method 300 in block 314. In some embodiments, block 314 may involve performing standard load requests for subsequent load instructions in a set of program instructions. In some embodiments, block 314 may also include attempting to detect further dependent pairs in the program instructions, such as by the process illustrated by blocks 102 through 106 of method 100. In some instances, however, the dependent load identified in block 302 may be the final load in the set of load instructions, and the processor may proceed to a further set of instructions.

If, on the other hand, the processor does detect a page mismatch message in block 310, the processor may translate the logical page number of the dependent data object to a physical page number in block 316. In some embodiments, the processor may obtain the logical page number from the page-mismatch message received in block 308. In other embodiments, the page-mismatch message may not provide the logical page number of the dependent data object. In these embodiments, the processor may first identify address data in the parent data object received in block 308 by using a memory offset provided in the program instructions.

Once the processor has translated the logical page number to a physical page number, the processor determines, in block 318, whether any further loads depend upon the dependent load identified in block 302 (i.e., whether the dependent load identified in block 302 is a parent load to any further loads). If the processor does identify a further dependent load, the processor proceeds to send, in block 306, a new enhanced load request for the new parent load (i.e., the dependent load identified in block 302) and the new dependent load. In some embodiments, this new enhanced load request may include the physical address of the new parent load that was translated in block 316, the logical page number of the new parent load, and instructions to prefetch the new dependent data object, such as instructions illustrated by method 200.

If, on the other hand, no further dependent load is identified in block 318, the processor sends a standard load request for the dependent data object in block 320. This standard load request may include the physical address of the dependent load and an instruction to fetch the dependent data object at that physical address. Once the processor has received the dependent data object as a result of block 320, the processor may conclude method 300 in block 314, as discussed above.

Previously discussed embodiments of the present disclosure have been presented as method abstractions. However, FIGS. 4A-4D are presented blow as graphical abstractions of an enhanced load request, for the purposes of understanding. The graphical objects illustrated in FIGS. 4A-4D are intended only to be example graphical abstract representations of computer-system structures.

Figure 4A:
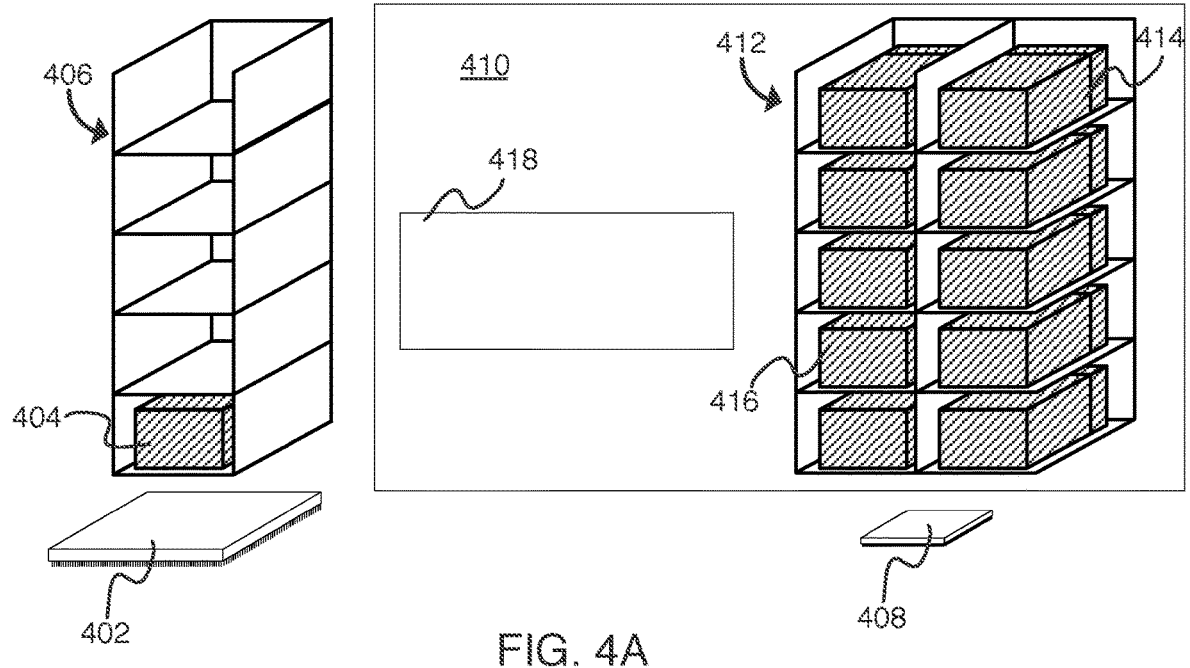
FIG. 4A depicts a graphical abstraction of a first stage of performing an enhanced load request, in accordance with embodiments of the present disclosure.

FIG. 4A depicts a graphical abstraction of a first stage of performing an enhanced load request, in accordance with embodiments of the present disclosure. In FIG. 4A, processor 402 may be analyzing a set of program instructions 404 that lists a set of data objects to load for the corresponding process. Load instructions 404 may be located in processor storage 406. In some embodiments, processor storage 406 may be one of various levels of processor cache or a set of processor registers.

Processor 402 may send load requests to memory controller 408. These load requests may instruct memory controller 408 to transmit data objects to processor storage 406 from system memory 410. Memory controller 408 may access data objects in system memory 410 based on the physical page on which the data objects are located. For example, memory 410 is illustrated here as containing physical page 412. Physical page 412 may store a plurality of data objects, such as data objects 414 and 416. As illustrated, memory 410 is shown as containing a reading queue 418. In FIGS. 4A-4D, reading queue 418 may simply be presented for the sake of understanding, to signify that memory controller 408 is analyzing a data object. Thus, when a data object is presented within reading queue 418, it is intended to signify that memory controller 408 is analyzing a data object, not necessarily that the data object has been relocated from page 412. In some embodiments, therefore, memory controller 408 may analyze data objects while they remain in place in page 412.

Processor 402 may detect, in program instructions 404, a list of data objects the processor requires to perform a process. Processor 402 may identify data object 414 as the first data object in the list, and the list may provide the logical address of data object 414. Processor 402 may also identify data object 416 as the second data object in the list, and may detect that the memory address of data object 416 is obtainable by locating address data in data object 414 using a memory offset provided by program instructions 404.

Thus, processor 402 may translate the logical address of data object 414 into a physical address and may send an enhanced load request to memory controller 408. The enhanced load request may identify the physical address and logical page number of data object 414 and the memory offset, request that the memory controller transmit data object 414, and prefetch data object 416.

Figure 4B:
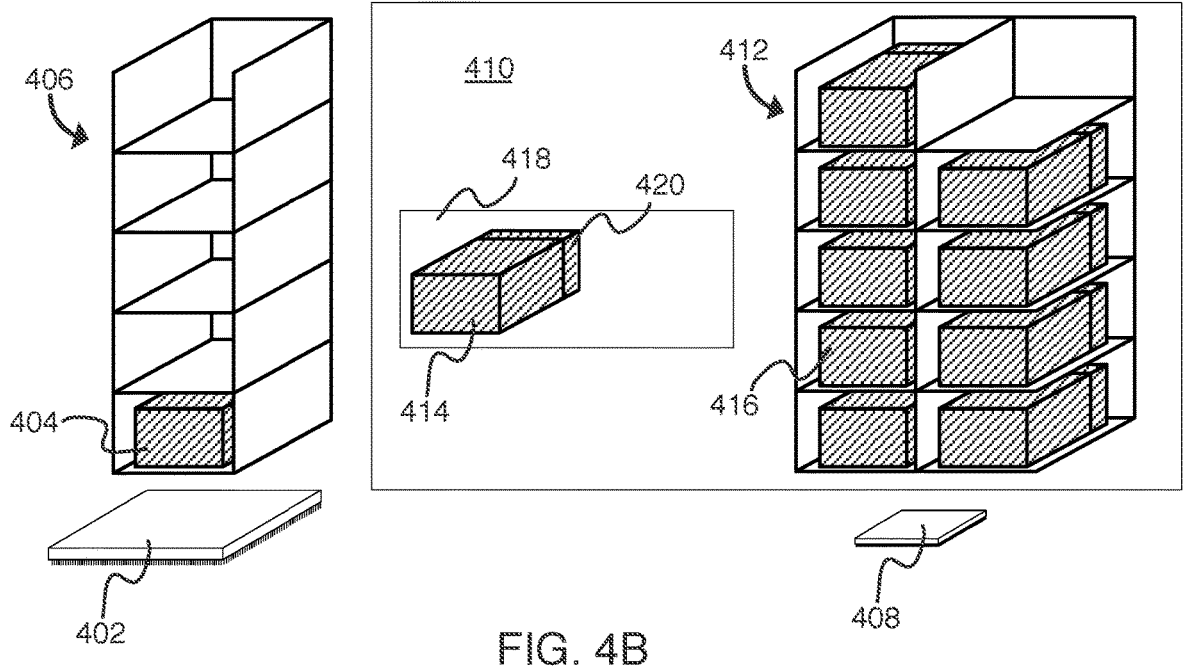
FIG. 4B depicts a graphical abstraction of a second stage an enhanced load request, in accordance with embodiments of the present disclosure.

FIG. 4B illustrates data object 414 in reading queue 418, signifying that memory controller 408 is reading data object 414. Memory controller 408 may obtain, from the enhanced load request, a memory offset associated with data object 414. Using that memory offset, the memory controller may locate address data 420 in data object 414. This address data may provide, to the memory controller, the logical address of data object 416. Based on the enhanced load request, memory controller 408 may compare the logical page number from this logical address with the logical page number of data object 414 (provided by processor 402 in the enhanced load request). Based on this comparison, memory controller 408 may conclude that data object 414 and data object 416 may share the same logical page number, and thus that data object 416 is also located on physical page 412. With this information, memory controller may be capable of using the logical address of data object 416 to locate data object 416 on physical page 412.

Figure 4C:
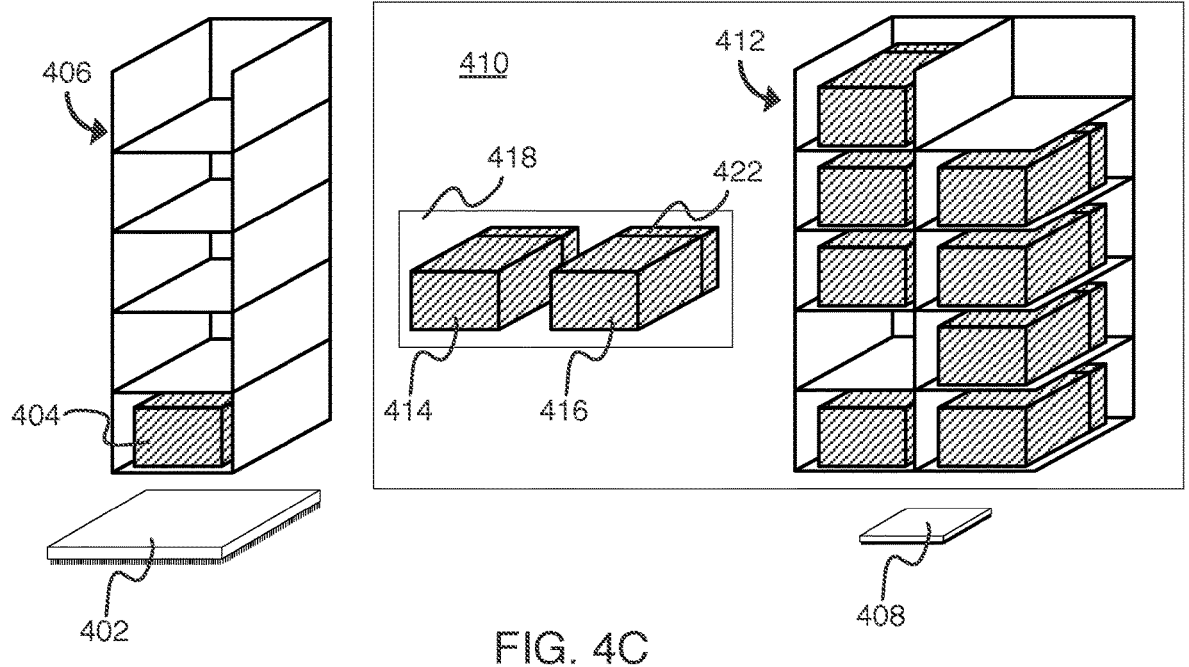
FIG. 4C depicts a graphical abstraction of a third stage of an enhanced load request, in accordance with embodiments of the present disclosure.

FIG. 4C illustrates both data object 414 and data object 416 in reading queue 418, signifying that memory controller has located data object 416 in physical page 412 and is capable, if necessary, of analyzing data object 416 and address data 422 located therein. This may be beneficial, for example, if the enhanced load request sent by processor 402 also contained a second memory offset corresponding to data object 416, and instructed memory controller 408 to prefetch another dependent data object with a memory address that is located in address data 422. This second memory offset may, for example, take the form of a distance between the beginning of data object 416 and address data 422.

Figure 4D:
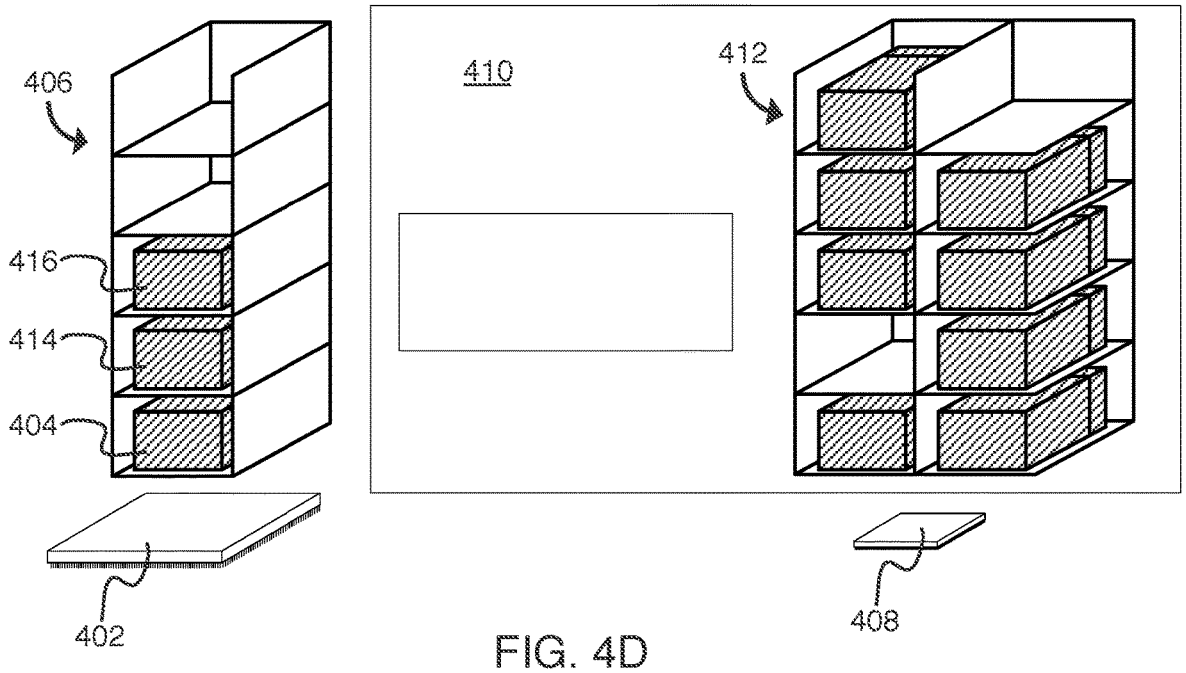
FIG. 4D depicts a graphical abstraction of a first stage of performing an enhanced load request, in accordance with embodiments of the present disclosure.

FIG. 4D illustrates both data object 414 and data object 416 located in processor storage 406 after the memory controller 408 transmits both data object 414 and data object 416 to processor 402. In some embodiments, processor 402 may analyze data object 416 to confirm that it is the data object specified by load instructions 404. If processor 402 determines that data object 416 is the correct data object, it may conclude that the enhanced load request was successful, and continue to send enhanced load requests for further instances of dependence relationships in program instructions 404.

Figure 5:
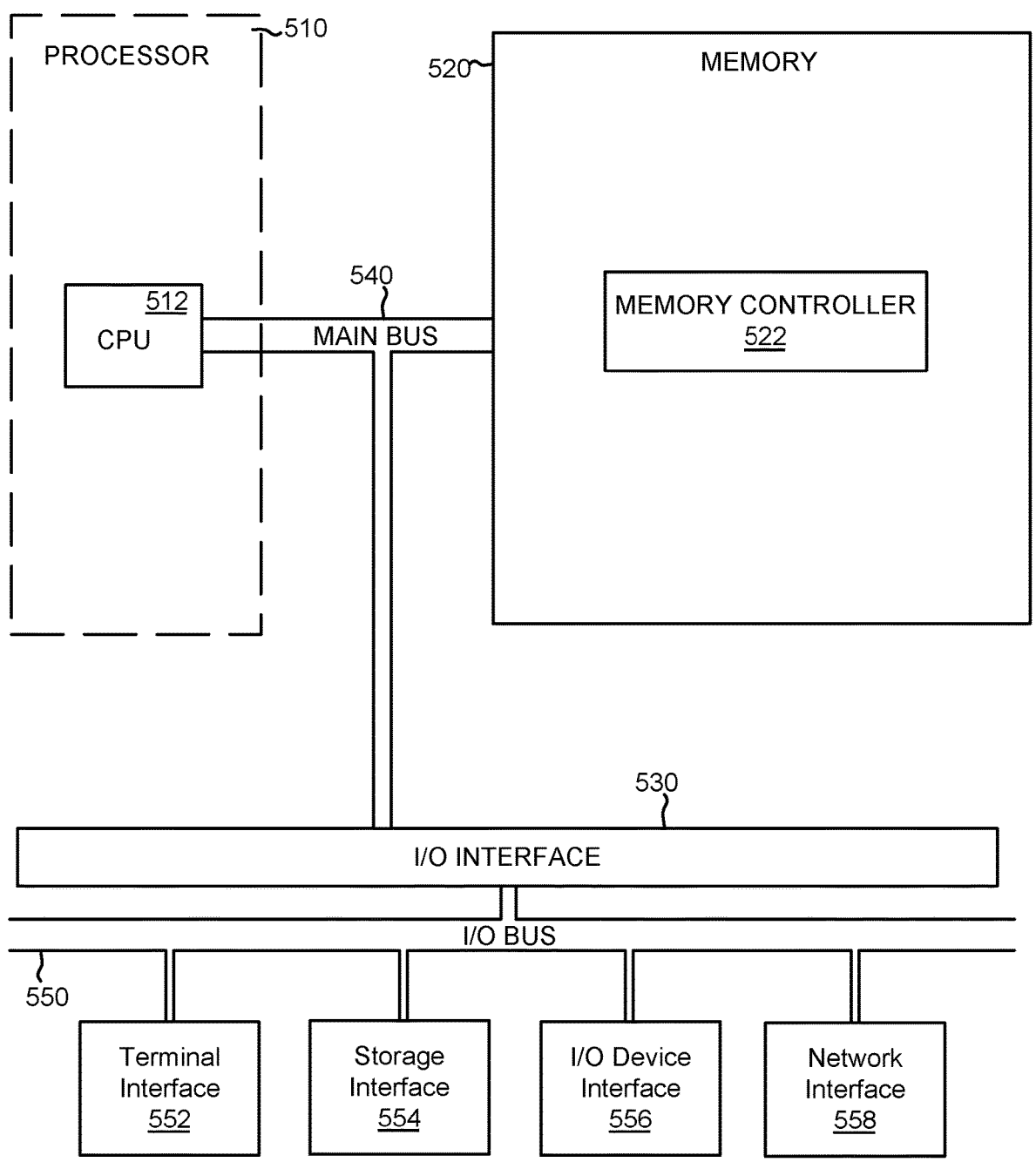
FIG. 5 depicts the representative major components of a computer system that may be used in accordance with embodiments.

FIG. 5 depicts the representative major components of an example Computer System 501 that may be used in accordance with embodiments of the present disclosure. The particular components depicted are presented for the purpose of example only and are not necessarily the only such variations. The Computer System 501 may include a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may include one or more CPUs 512. The Processor 510 may additionally include one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may include one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may include a Memory Controller 522 and one or more memory modules for temporarily or permanently storing data (not depicted). In some embodiments, the Memory 520 may include a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may include an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may include the Terminal Interface 552, the Storage Interface 554, the I/O Device Interface 556, and the Network Interface 558. In some embodiments, the various interfaces may include a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a processor, a set of dependence relationships in a set of program instructions, wherein the set of dependence relationships comprises:

a first load instruction to load a first data object;
a second load instruction to load a second data object from a second address, wherein the second address is provided by address data within the first data object;
a third load instruction to load a third data object from a third address, wherein the third address is provided by address data within the second data object;
identifying, by the processor, a number of instances of dependence in the set of dependence relationships, wherein the number of instances of dependence comprises a number of data-object memory addresses of a previously loaded data object, and wherein the identifying comprises:
detecting a first instance of dependence based on the second address being provided by address data within the first data object; and
detecting a second instance of dependence based on the third address being provided by address data within the second data object;
determining, by the processor, that the number of instances is over a pattern threshold; and
sending, by the processor and based on the determining, an enhanced load request to a memory controller, the enhanced load request comprising instructions to:
load the first data object from a first address on a physical page;
locate, in the first data object and based on a first memory offset, address data for the second data object;
obtain, from the address data, the second address;
load the second data object from the second address; and
transmit the first data object and the second data object to the processor.

2. The method of claim 1, wherein the enhanced load request also comprises instructions to:
obtain a first logical page number from the enhanced load request, wherein the first logical page number is the logical page number for the first data object;
identify, based on the address data, a second logical page number on which the second address is located; and
determine that the first logical page number is the same as the second logical page number;
wherein the loading the second data object is in response to determining that the second logical page number is the same as the first logical page number.

3. The method of claim 1, wherein the pattern threshold is 2 iterations.

4. The method of claim 1, further comprising determining, by the processor, that the second data object is the data object referenced in the set of program instructions.

5. The method of claim 1, further comprising:
determining, by the processor, that the second data object is not the data object referenced in the set of program instructions; and
discarding the second data object.

6. The method of claim 2, further comprising calculating a hashed version of the first logical page, wherein the first logical page obtained from the enhanced load request is the hashed version of the first logical page.

7. The method of claim 1, wherein the memory offset comprises a distance between a reference point in memory and a pointer within the first data object.

8. The method of claim 1, further comprising:
receiving, from the memory controller, the first data object, a page-mismatch message, and the second logical address;
determining, based on the receiving the page-mismatch message, a physical address of the second data object; and
sending a standard load request to the memory controller, wherein the standard load request comprises the physical address of the second data object.

9. A system comprising:
a processor; and
a memory in communication with the processor, the memory containing process instructions that, when executed by the processor, are configured to cause the processor to perform a method, the method comprising:
detecting, by a processor, a set of dependence relationships in a set of program instructions, wherein the set of dependence relationships comprises:
a first load instruction to load a first data object;
a second load instruction to load a second data object from a second address, wherein the second address is provided by address data within the first data object;
a third load instruction to load a third data object from a third address, wherein the third address is provided by address data within the second data object;
identifying, by the processor, a number of instances of dependence in the set of dependence relationships, wherein the number of instances of dependence comprises a number of data-object memory addresses of a previously loaded data object, and wherein the identifying comprises:
detecting a first instance of dependence based on the second address being provided by address data within the first data object; and
detecting a second instance of dependence based on the third address being provided by address data within the second data object;
determining, by the processor, that the number of instances is over a pattern threshold; and
sending, by the processor and based on the determining, an enhanced load request to a memory controller, the enhanced load request comprising instructions to:
load the first data object from a first address on a physical page;
locate, in the first data object and based on a first memory offset, address data for the second data object;
obtain, from the address data, the second address;
load the second data object from the second address; and
transmit the first data object and the second data object to the processor.

10. The system of claim 9, wherein the enhanced load request also comprises instructions to:
obtain a first logical page number from the enhanced load request, wherein the first logical page number is the logical page number for the first data object;
identify, based on the address data, a second logical page number on which the second address is located; and
determine that the first logical page number is the same as the second logical page number;
wherein the loading the second data object is in response to determining that the second logical page number is the same as the first logical page number.

11. The system of claim 9, wherein the pattern threshold is 2 iterations.

12. The system of claim 9, wherein the process instructions are further configured to cause the processor to determine, by the processor, that the second data object is the data object referenced in the set of program instructions.

13. The system of claim 9, wherein the process instructions are further configured to cause the processor to:
- determine, by the processor, that the second data object is not the data object referenced in the set of program instructions; and
- discard the second data object.

14. The system of claim 10, wherein the process instructions are further configured to cause the processor to calculate a hashed version of the first logical page, wherein the first logical page obtained from the enhanced load request is the hashed version of the first logical page.

15. The system of claim 9, wherein the memory offset comprises a distance between a reference point in memory and a pointer within the first data object.

16. The system of claim 9, wherein the process instructions are further configured to cause the processor to:
- receive, from the memory controller, the first data object, a page-mismatch message, and the second logical address;
- determine, based on the receiving the page-mismatch message, a physical address of the second data object; and
- send a standard load request to the memory controller, wherein the standard load request comprises the physical address of the second data object.

17. A computer program product, the computer program product comprising a computer readable storage medium having process instructions embodied therewith, the process instructions executable by a computer to cause the computer to:
- detect, by a processor, a set of dependence relationships in a set of program instructions, wherein the set of dependence relationships comprises:
  - a first load instruction to load a first data object;
  - a second load instruction to load a second data object from a second address, wherein the second address is provided by address data within the first data object;
  - a third load instruction to load a third data object from a third address, wherein the third address is provided by address data within the second data object;
- identify, by the processor, a number of instances of dependence in the set of dependence relationships, wherein the number of instances of dependence comprises a number of data-object memory addresses of a previously loaded data object, and wherein the identifying comprises:
  - detecting a first instance of dependence based on the second address being provided by address data within the first data object; and
  - detecting a second instance of dependence based on the third address being provided by address data within the second data object;
- determine, by the processor, that the number of instances is over a pattern threshold; and
- send, by the processor and based on the determining, an enhanced load request to a memory controller, the enhanced load request comprising instructions to:
  - load the first data object from a first address on a physical page;
  - locate, in the first data object and based on a first memory offset, address data for the second data object;
  - obtain, from the address data, the second address;
  - load the second data object from the second address; and
  - transmit the first data object and the second data object to the processor.

18. The computer program product of claim 17, wherein the enhanced load request also comprises instructions to:
- obtain a first logical page number from the enhanced load request, wherein the first logical page number is the logical page number for the first data object;
- identify, based on the address data, a second logical page number on which the second address is located; and
- determine that the first logical page number is the same as the second logical page number;
- wherein the loading the second data object is in response to determining that the second logical page number is the same as the first logical page number.

19. The computer program product of claim 17, wherein the pattern threshold is 2 iterations.

20. The computer program product of claim 17, wherein the process instructions are further configured to cause the processor to determine, by the processor, that the second data object is the data object referenced in the set of program instructions.

* * * * *